(12) United States Patent
Roy

(10) Patent No.: US 7,251,116 B2
(45) Date of Patent: Jul. 31, 2007

(54) LOW INDUCTANCE MULTILAYER CAPACITOR

(76) Inventor: Apurba Roy, 2313 Camino Robledo, Carlsbad, CA (US) 92009

( * ) Notice: Subject to any disclaimer, the term of this patent is extended or adjusted under 35 U.S.C. 154(b) by 0 days.

(21) Appl. No.: 11/457,523

(22) Filed: Jul. 14, 2006

(65) Prior Publication Data

US 2007/0019364 A1    Jan. 25, 2007

Related U.S. Application Data

(60) Provisional application No. 60/700,642, filed on Jul. 19, 2005.

(51) Int. Cl.
*H01G 4/005* (2006.01)
*H01G 4/06* (2006.01)

(52) U.S. Cl. ...................... 361/303; 361/311

(58) Field of Classification Search ........ 361/303–305, 361/311
See application file for complete search history.

(56) References Cited

U.S. PATENT DOCUMENTS

| | | | |
|---|---|---|---|
| 4,419,714 A | 12/1983 | Locke | |
| 4,430,690 A | 2/1984 | Chance et al. | |
| 5,369,545 A | 11/1994 | Bhattacharyya et al. | |
| 5,880,925 A | 3/1999 | DuPre et al. | |
| 6,243,253 B1 | 6/2001 | DuPre et al. | |
| 6,795,294 B2 | 9/2004 | Kuroda et al. | |
| 6,965,507 B2 * | 11/2005 | Togashi et al. | 361/303 |
| 7,019,957 B2 * | 3/2006 | Togashi et al. | 361/303 |
| 2004/0179325 A1 | 9/2004 | Togashi et al. | |
| 2004/0184202 A1 | 9/2004 | Togashi et al. | |
| 2006/0028785 A1 | 2/2006 | Togashi et al. | |
| 2007/0019363 A1 * | 1/2007 | Roy | 361/303 |
| 2007/0019365 A1 * | 1/2007 | Roy | 361/303 |

* cited by examiner

*Primary Examiner*—Eric Thomas
(74) *Attorney, Agent, or Firm*—Polster, Lieder & Lucchesi, L.C.

(57) ABSTRACT

A multilayer parallel plate capacitor with an extremely low inductance comprises a generally rectangular parallelepiped that includes at least one pair of generally rectangular consecutive composite layers stacked parallel to each other in the vertical direction, each composite layer of the pair comprising a dielectric substrate and a conductor plate thereon. Each conductor plate includes two or more lead portions to enable connection to terminal electrodes, and plates on consecutive composite layers are connected to terminal electrodes of opposite polarity. Each conductor plate advantageously includes one or more non-conductive regions comprising slots in the transverse direction, and one or more non-conductive regions comprising slots in the longitudinal direction. These slots provide directionality to the electrical currents through the plates, resulting in a capacitor structure with greatly reduced inductance.

61 Claims, 10 Drawing Sheets

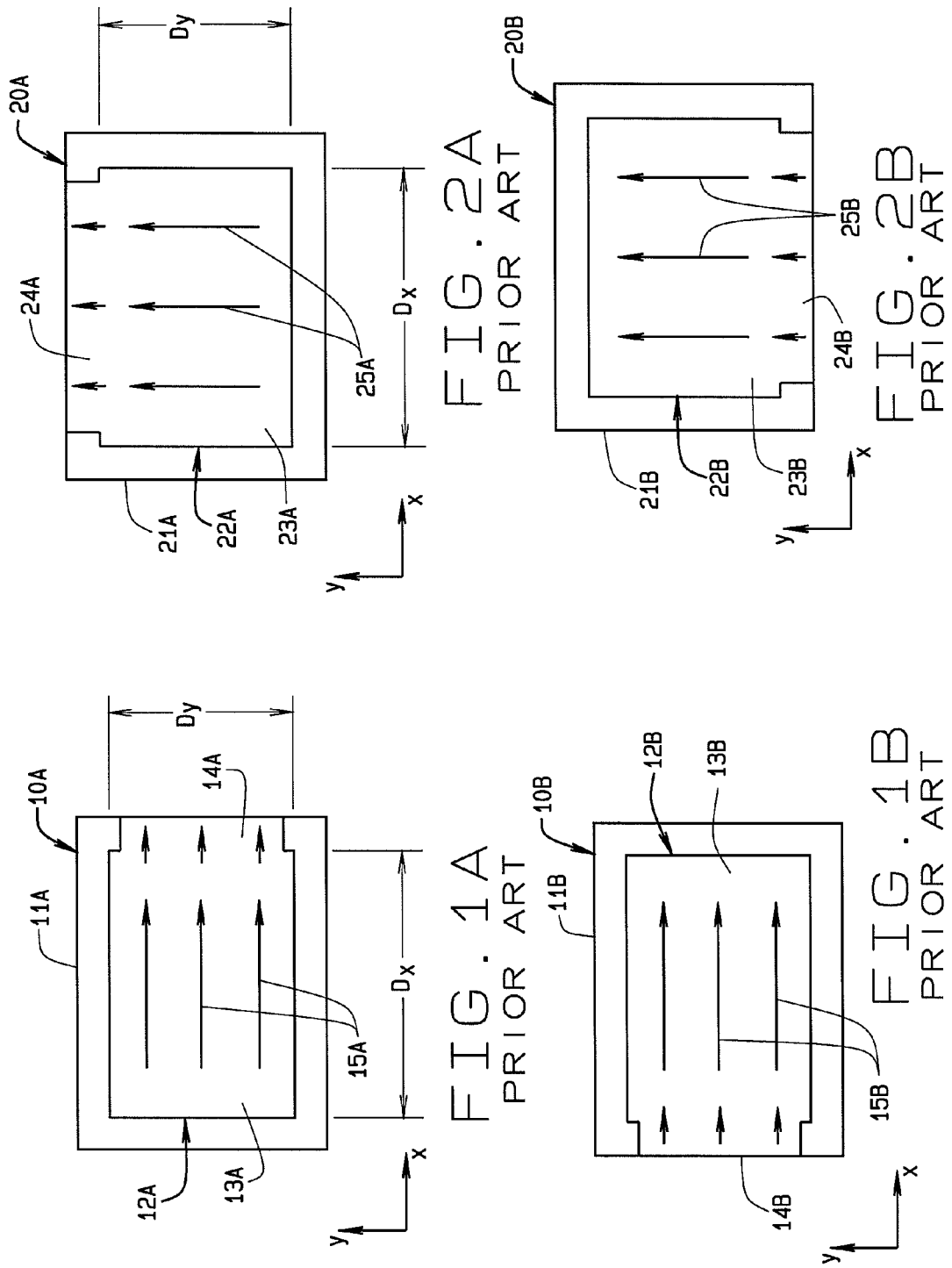

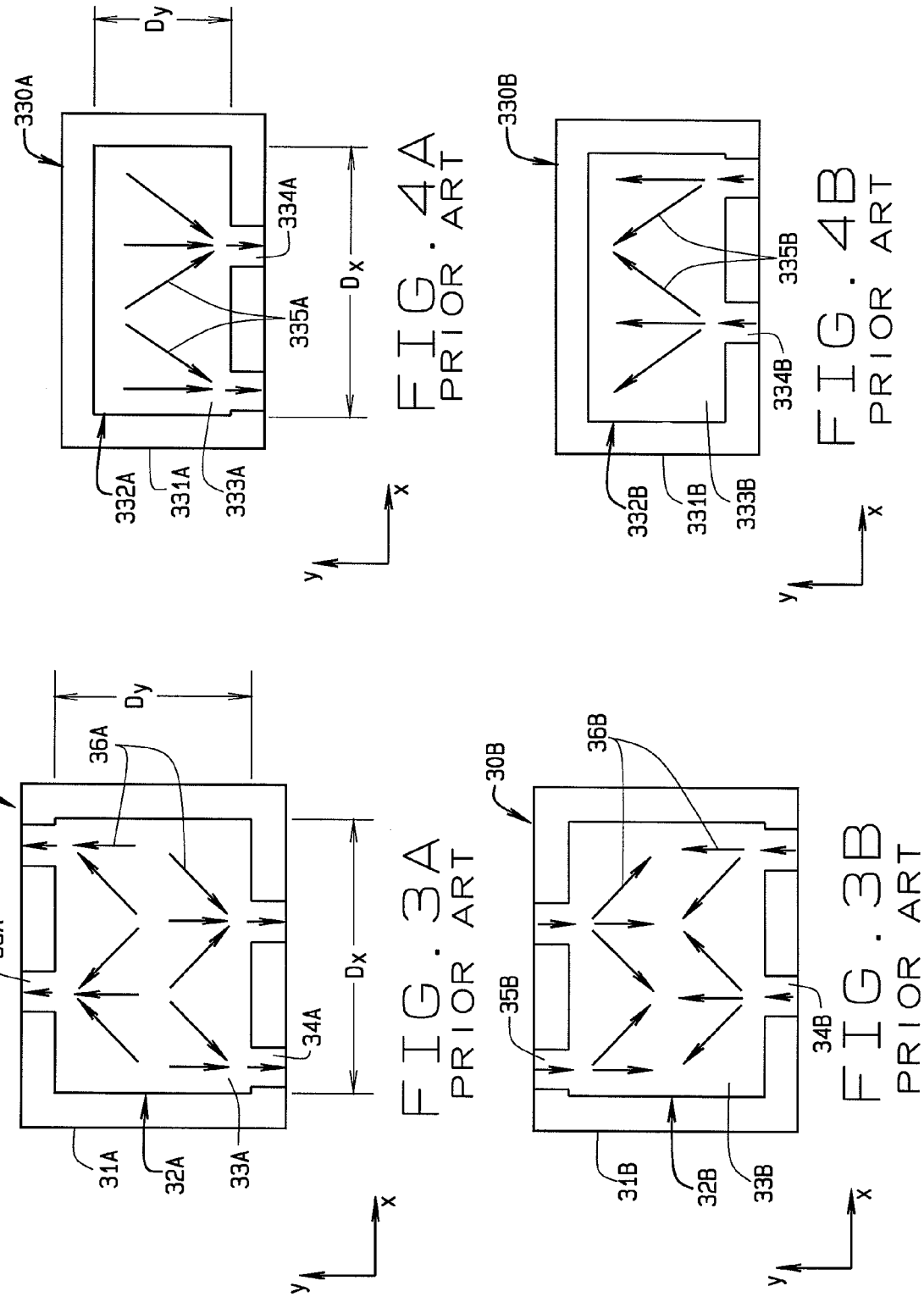

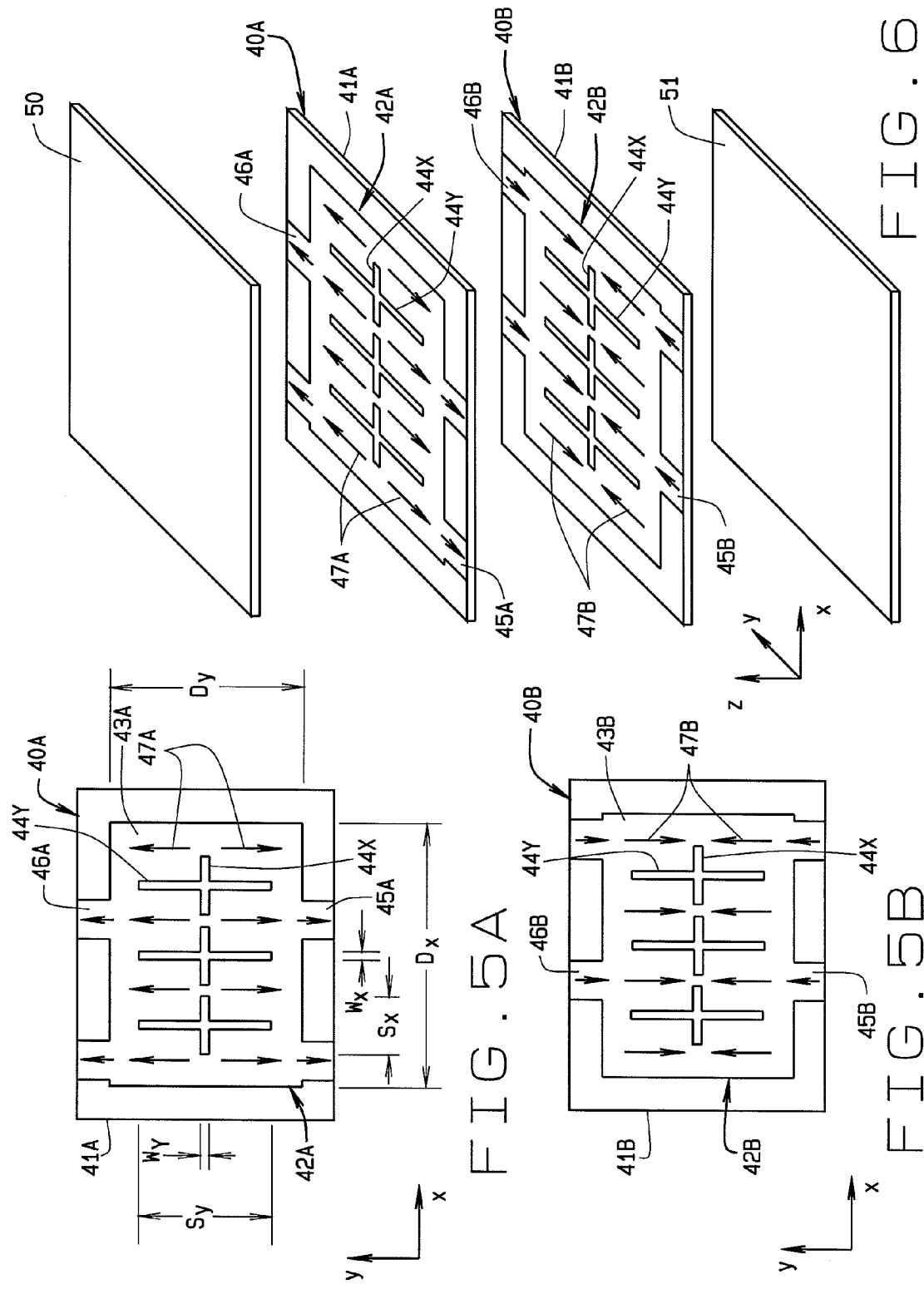

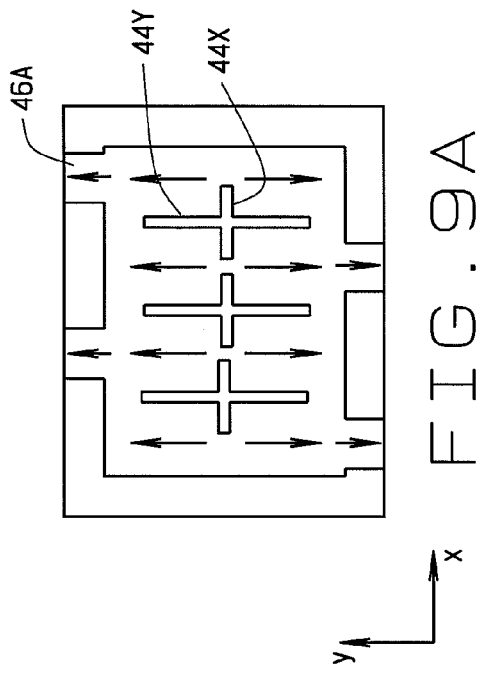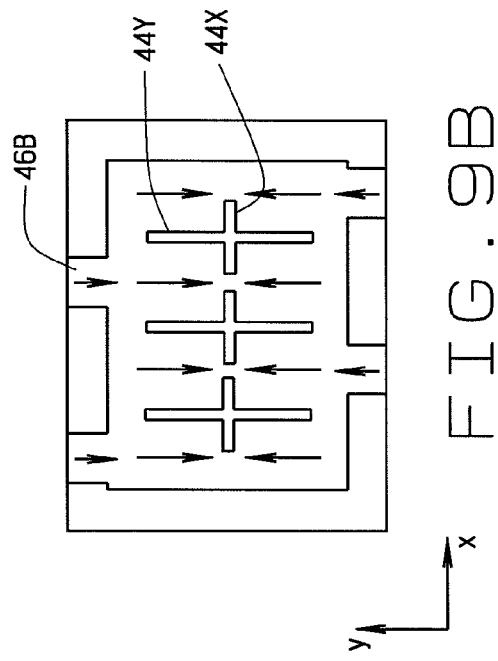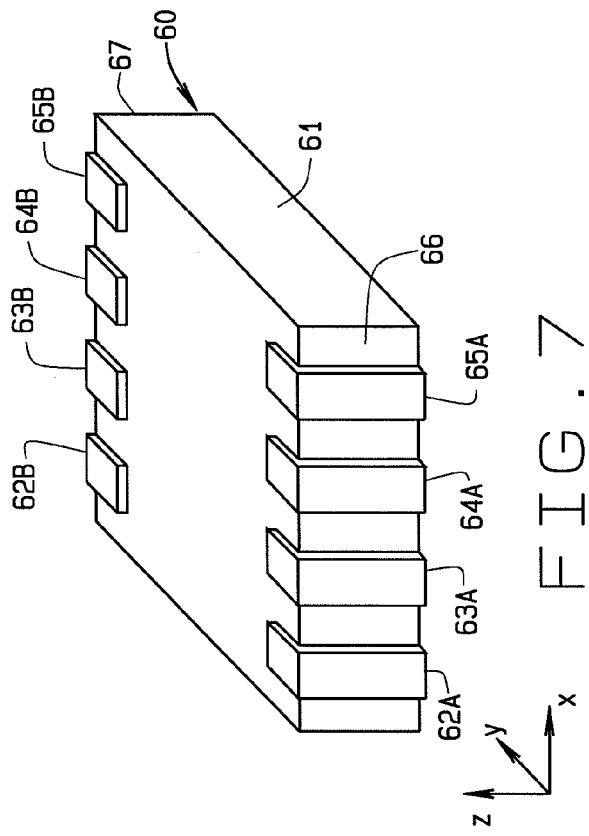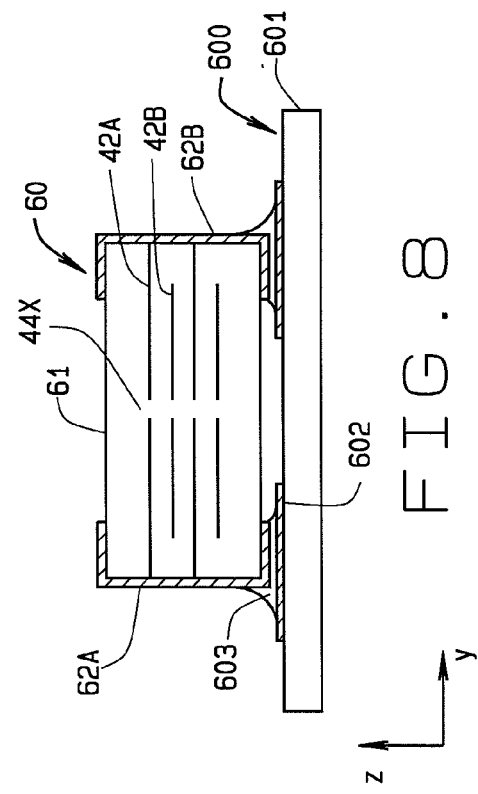

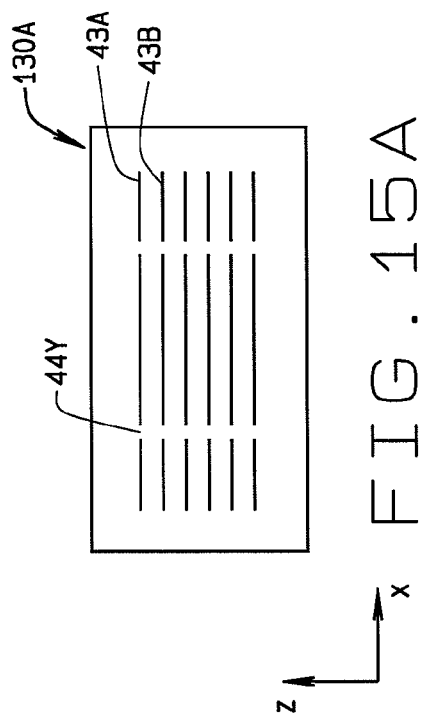
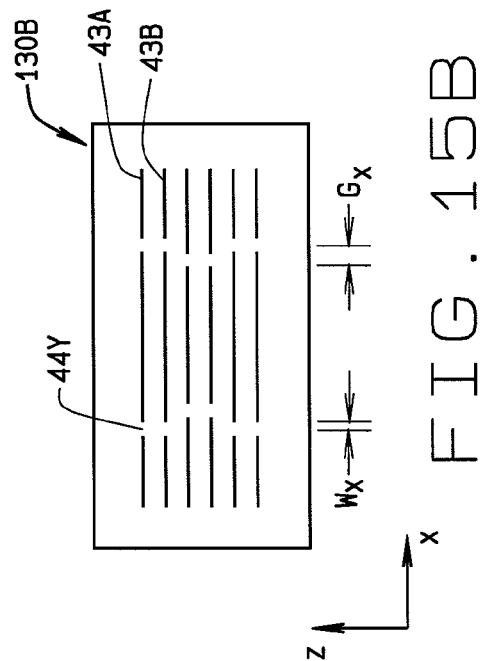
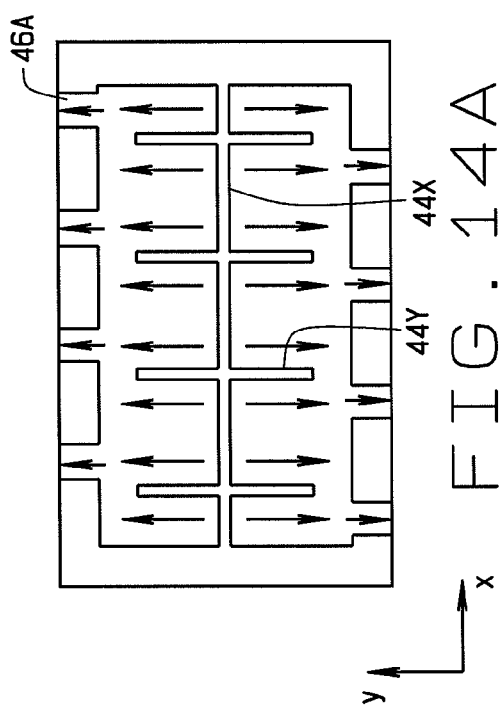
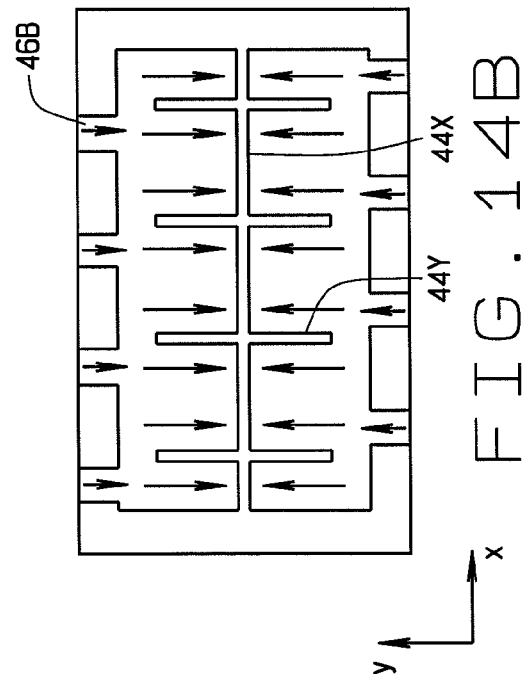

ated are limited in the frequency range of their useand a lead portion 14A extending to an edge of the substrate

LOW INDUCTANCE MULTILAYER CAPACITOR

CROSS-REFERENCE TO RELATED APPLICATIONS

The present application is related to, and claims priority from, U.S. Provisional Patent Application Ser. No. 60/700,642 filed on Jul. 19, 2005, which is herein incorporated by reference.

STATEMENT REGARDING FEDERALLY SPONSORED RESEARCH

Not Applicable.

BACKGROUND OF THE INVENTION

The present invention relates to multilayer parallel plate capacitors with extremely low inductance.

Multilayer parallel plate capacitors find ubiquitous use in electronics for filters, decoupling of high speed circuitry and integrated circuits (IC's), and energy storage. However, these capacitors, whether made of multilayer ceramic, multilayer laminate, thick or thin-film metallization, or other materials, are limited in the frequency range of their usefulness due to inductive effects associated with their structure. Since charging and discharging of a capacitor involves the flow of electrons through the conductor plates, the resulting current gives rise to an effective inductance, L, called the Equivalent Series Inductance (ESL), which is dependent on the geometry of the conductor plates and the direction of the current through the plates. This inductance limits the useful frequency range of a capacitor with capacitance C to a frequency less than a resonance frequency, Fr:

$$F = 1/2\pi\sqrt{LC}.$$

Rapid increases in clock speeds of microprocessors, digital signal processors and other IC's are driving the need for faster filtering and decoupling, i.e., capacitive devices with lower inductance, L, and therefore higher Fr.

For capacitors used as energy storage devices in the output of power supplies for high-speed IC's, this inductance gives rise to a switching noise voltage, $\Delta V$:

$$\Delta V \sim L \, di/dt,$$

where di/dt is the rate of change of the current drawn by the IC.

The magnitude of di/dt increases with increasing transistor count and increasing clock speed. This is driving the need for high-capacitance energy storage capacitors with lower inductance, L, in order to keep the noise voltage, $\Delta V$, to acceptable levels, particularly as supply voltages decrease. It is clear that there is a need for capacitors whose structure allows for a lower inductance than capacitors of the prior art, while retaining the same level of capacitance.

Conventional multilayer parallel plate capacitors typically comprise a structure in the form of a rectangular parallelepiped that includes several pairs of rectangular composite layers stacked in parallel vertically, each composite layer of a pair comprising a dielectric substrate and a conductor plate thereon. Plates on consecutive composite layers are connected to terminal electrodes of opposite polarity. FIGS. 1A and 1B show two rectangular composite layers 10A and 10B that comprise a pair of consecutive composite layers of a conventional multilayer capacitor. Composite layer 10A comprises a dielectric substrate 11A and a conductor plate 12A. The conductor plate 12A includes a main portion 13A and a lead portion 14A extending to an edge of the substrate to enable connection to an external terminal electrode. Consecutive composite layer 10B comprises a dielectric substrate 11B and a conductor plate 12B. Plate 12B includes a main portion 13B and a lead portion 14B. Each main plate portion 13A and 13B has a longitudinal dimension Dx and a transverse dimension Dy.

With reference to the coordinate system shown in FIGS. 1A and 1B, the longitudinal dimension Dx is along the x-axis, and the transverse dimension Dy is along the y-axis. Generally, Dx is greater than Dy. For a given thickness of the dielectric substrates 11A and 11B, and for a given dielectric constant, the capacitance of the structure is proportional to the area of the plates, A=DxDy. The lead portions 14A and 14B are disposed along the transverse dimension, or y-axis. When a positive potential is applied to plate 12A, and a corresponding negative potential is applied to plate 12B, the charging process gives rise to electron currents through the plates in the x-direction, as shown by the arrows 15A and 15B.

The inductance, L, associated with this structure is a combination of the self inductance, Ls, of each plate, and the mutual inductance, M, between the plates. Since the currents flow in the x-direction, the self inductance is that of a conductor of length Dx. Further, since the current in each of the plates flows in the same direction, the mutual inductance is additive in nature. Thus the inductance of the structure is given by:

$$L \sim Ls + M.$$

Typically, the inductance of such conventional parallel plate capacitors, made with multilayer ceramic, is in the range of 1000 pH.

Prior art techniques aimed at reducing the inductance of multilayer parallel plate capacitors have taken two main approaches: (i) reducing Ls and M concurrently by reducing the length of the plates in the direction of current flow; and (ii) arranging for the currents through plates in consecutive composite layers to flow in opposite directions, thereby rendering the mutual inductance between the plates to be subtractive in nature.

The first approach is illustrated in FIGS. 2A and 2B, which show two rectangular composite layers 20A and 20B that comprise a pair of consecutive composite layers of a low inductance multilayer capacitor of the prior art. Composite layers 20A and 20B comprise dielectric substrates 21A and 21B and conductor plates 22A and 22B respectively. Plates 22A and 22B each include main portions 23A and 23B and lead portions 24A and 24B respectively. Like the conventional multilayer capacitor of FIGS. 1A and 1B, the main plate portions have dimensions of Dx and Dy along the x and y-axes. The area of the plates, and hence the capacitance, is the same. Unlike the capacitor of FIGS. 1A and 1B, the lead portions 24A and 24B are disposed along the longitudinal dimension, or x-axis. When a positive potential is applied to plate 22A, and a corresponding negative potential is applied to plate 22B, the charging process leads to electron currents through the plates in the y-direction, as shown by the arrows 25A and 25B. Since the inductance of a conductor of length l is given by:

$$L \sim l \, (\ln l),$$

and the length of the plates, Dy, in the y-direction, is less than that, Dx, in the x-direction, both Ls and M, and hence the inductance L, are lower than the conventional multilayer capacitor. However, this approach, although it has resulted in inductance reductions to the 500 pH level for multilayer ceramic capacitors, is limited by practical constraints of minimizing Dy while retaining the plate area DxDy.

Examples of the second approach are disclosed, recently, in U.S. Pat. Nos. 5,880,925, 6,243,253B1, and 6,795,294B2, and previously, in U.S. Pat. Nos. 4,419,714, 4,430,690, and 5,369,545. This approach is illustrated in FIGS. 3A and 3B, which show two rectangular composite layers 30A and 30B that comprise a pair of consecutive composite layers of a low inductance multilayer capacitor of the prior art. Composite layers 30A and 30B comprise dielectric substrates 31A and 31B, and conductor plates 32A and 32B respectively. Plates 32A and 32B each include main portions 33A and 33B respectively, each with longitudinal dimension Dx along the x-axis, and transverse dimension Dy along the y-axis, with reference to the coordinate system shown. Plate 32A additionally includes at least one, and typically two or more, lead portions 34A disposed along one of the longitudinal edges of the plate, and at least one, and typically two or more, lead portions 35A disposed along the opposed longitudinal edge.

Plate 32B additionally includes at least one, and typically two or more, lead portions 34B and 35B disposed along each of the corresponding longitudinal edges of the plate. The lead portions 34A and 34B are positioned such that they are offset from each other in an alternating pattern when the composite layers are stacked vertically. The lead portions 35A and 35B are positioned in a similar fashion. Each of the lead portions 34A and 34B, and 35A and 35B, extend to the corresponding longitudinal edge of the substrates 31A and 31B to enable connection to external terminal electrodes. As shown, the multilayer capacitor of FIGS. 3A and 3B is an 8 terminal device, with 4 terminal electrodes along each longitudinal edge, alternating in polarity. When a positive potential is applied to plate 32A, and a corresponding negative potential is applied to plate 32B, the charging process leads to electron currents through the plates in the directions shown by the arrows 36A and 36B. Since each plate has terminations on opposing longitudinal edges, roughly half the current in each plate traverses a length that is roughly half of Dy, depending on the symmetry of the external circuitry connected to these opposing terminations. This leads to a decrease in both Ls and M. Further, the currents in plate 32A are roughly opposed in directions to the currents in plate 32B. The mutual inductance between the plates is thus subtractive in nature, and the inductance of the structure is:

$$L \sim Ls - M.$$

Although this inductance is generally lower than that of the capacitor of FIGS. 2A and 2B, the effectiveness of this approach is limited by the extent to which the magnitude of the mutual inductance M can be made to match the self inductance Ls. This is determined by the degree to which the currents in the consecutive plates are opposite to each other, in both magnitude and direction, over the expanse of the plates, i.e., by the degree to which the currents in any section of one plate are matched by equal and opposite currents in the corresponding section of the other plate. As shown by the arrows 36A and 36B, this matching of the currents in plates 32A and 32B is only partial. Although the matching can theoretically be improved by greatly increasing the number of terminations along each edge, practical considerations put a limit on the number of terminations in a viable device. Thus, this approach has resulted in inductance reductions only to the 100 pH level for multilayer ceramic capacitors.

Further examples of the second approach, in the case of multilayer capacitors with single-sided terminations, are disclosed in U.S. Pat. Nos. 4,419,714, 4,430,690, and 5,369, 545, and discussed in U.S. Pat. Nos. 5,880,925, 6,243,253 B1, and 6,795,294 B2. This approach is illustrated in FIGS. 4A and 4B, which show two rectangular composite layers 330A and 330B that comprise a pair of consecutive composite layers of a low inductance multilayer capacitor of the prior art. Composite layers 330A and 330B comprise dielectric substrates 331A and 331B, and conductor plates 332A and 332B respectively. Plates 332A and 332B each include main portions 333A and 333B respectively, each with longitudinal dimension Dx along the x-axis, and transverse dimension Dy along the y-axis, with reference to the coordinate system shown. Plate 332A additionally includes at least one, and typically two or more, lead portions 334A disposed along one of the longitudinal edges of the plate.

Plate 332B additionally includes at least one, and typically two or more, lead portions 334B disposed along one of the longitudinal edges of the plate. The lead portions 334A and 334B are positioned such that they are along the same longitudinal edge and are offset from each other in an alternating pattern when the composite layers are stacked vertically. Each of the lead portions 334A and 334B extend to the longitudinal edge of the substrates 331A and 331B to enable connection to external terminal electrodes.

As shown, the multilayer capacitor of FIGS. 4A and 4B has four terminal electrodes, positioned along a longitudinal edge, and alternating in polarity. When a positive potential is applied to plate 332A, and a corresponding negative potential is applied to plate 332B, the charging process leads to electron currents through the plates in the directions shown by the arrows 335A and 335B. The currents in plate 332A are roughly opposed in directions to the currents in plate 332B. The mutual inductance between the plates is thus subtractive in nature, and the inductance of the structure is:

$$L \sim Ls - M.$$

Although this inductance is generally lower than that of the capacitor of FIGS. 2A and 2B, the effectiveness of this approach is limited by the extent to which the magnitude of the mutual inductance M can be made to match the self inductance Ls. This is determined by the degree to which the currents in the consecutive plates are opposite to each other, in both magnitude and direction, over the expanse of the plates, i.e., by the degree to which the currents in any section of one plate are matched by equal and opposite currents in the corresponding section of the other plate. As shown by the arrows 335A and 335B, this matching of the currents in plates 332A and 332B is only partial. Although the matching can theoretically be improved by greatly increasing the number of terminations, practical considerations put a limit on the number of terminations in a viable device. Thus, this approach has resulted in inductance reductions only to the 100 pH level for multilayer ceramic capacitors.

A third approach aimed at reducing the inductance of multilayer capacitors, as disclosed in U.S. Patent Application Publication Nos. U.S. 2004/0179325 A1 and U.S. 2004/0184202 A1, arranges for the currents through the plates on a composite layer to flow in opposite adjacent directions within the layer, as well as in opposite directions with respect to a consecutive composite layer. Shaping of the conductor plate on a composite layer to enable current flow in opposite adjacent directions within the layer results in more than doubling the length of the plate. The concomitant increase in the self inductance, Ls, of the plate places a greater reliance on the subtractive effect of the mutual inductance, M, between plates on consecutive layers in order to reduce the overall inductance, L, of the structure. This has limited the effectiveness of this approach to inductance reductions to the level of 100 pH for multilayer ceramic capacitors.

The disclosures of the foregoing U.S. Pat. Nos. 4,419,714, 4,430,690, 5,369,545, 5,880,925, 6,243,253 B1, 6,795,294 B2, and U.S. Patent Application Publication Nos. 2004/0179325 A1 and 2004/0184202 A1, are each hereby incorporated into this application by reference.

BRIEF SUMMARY OF THE INVENTION

Briefly stated, the present invention provides a multilayer parallel plate capacitor with extremely low inductance comprising a structure in the form of a generally rectangular parallelepiped that includes at least one pair, and preferably several pairs, of generally rectangular consecutive composite layers stacked parallel to each other in the vertical direction. Each composite layer of the pair comprises a dielectric substrate and a conductor plate thereon. Each conductor plate includes two or more lead portions to enable connection to terminal electrodes, and conductor plates on consecutive composite layers are connected to terminal electrodes of opposite polarity. Each conductor plate advantageously includes one or more non-conductive regions comprising slots in the transverse direction, and one or more non-conductive regions comprising slots in the longitudinal direction. These slots provide directionality to the currents through the conductor plates, resulting in a capacitor structure with greatly reduced inductance.

These capacitors of the present invention can be fabricated using multilayer ceramic techniques, multilayer laminate techniques, or multilayer deposition techniques to create the composite layers. In the case of multilayer ceramics, the dielectric substrate may comprise a ceramic composition, and the conductor plate may comprise a metallization with slots formed using a thick-film conductive paste, applied through a screen or stencil. Multiple pairs of consecutive composite layers may be stacked, laminated, diced, and sintered to form monolithic capacitor structures. These structures can be in the form of discrete surface mount capacitor devices, or they can be integrated within, and as part of, a multilayer substrate. As a discrete device, terminal electrodes may be formed around the edges of the capacitor, preferably using thick-film and plating techniques. Alternatively, the device can be made as a leadless LGA (Land Grid Array) package, using thick-film and plating techniques, or the device may be made as a BGA (Ball Grid Array) package, using solder balls. As a device integrated into a multilayer ceramic substrate, terminal electrodes preferably comprise vias within the multilayer substrate.

When fabricated using multilayer laminate techniques, the dielectric substrate may comprise a polymer or other organic composition, or a polymer-ceramic composition, and the conductor plate may comprise a metallization with slots, formed using a plating and etching technique, or a thin-film deposition technique, such as CVD (Chemical Vapor Deposition) or sputtering. In the case where a dielectric substrate with pre-clad metallization on both top and bottom surfaces is used, the addition of a bare dielectric substrate produces the equivalent of a pair of composite layers. Multiple pairs of consecutive composite layers may be stacked, laminated and diced to form laminated capacitor structures. These structures can be in the form of discrete surface mount capacitor devices, or they can be integrated within, and as part of, a multilayer substrate. As a discrete device, terminal electrodes are formed around the edges of the capacitor, preferably using plating techniques. Alternatively, the device can be made as a leadless LGA (Land Grid Array) package, using plating techniques, or the device may be made as a BGA (Ball Grid Array) package, using solder balls. When configured as part of a multilayer laminate substrate, terminal electrodes preferably comprise vias within the multilayer substrate.

Advantageously, these extremely low inductance capacitors can be used to provide electronic packages with built-in high speed decoupling, filtering or energy storage, as would be particularly useful for packaging microprocessors, digital signal processors, and other high speed integrated circuits. These packages may comprise multilayer laminate or ceramic substrates, with capacitors of the present invention: (i) integrated as part of the multilayer substrate, (ii) embedded in the form of discrete devices within enclosures in the multilayer substrate, or (iii) mounted in the form of discrete devices on an outer surface of the multilayer substrate.

Advantageously, these extremely low inductance capacitors can be used to provide power supplies for high speed integrated circuits that maintain a high level of output voltage regulation in the face of large and rapid changes in the current drawn by the integrated circuits. These power supplies include capacitors of the present invention, as energy storage devices, at the output of, or integrated within, the power supply package.

When fabricated using multilayer deposition techniques, the dielectric substrate may comprise a metallic oxide or nitride composition, and the conductor plate may comprise a metallization including slots, with both the substrate and the plate formed using a thin-film deposition technique, such as CVD or sputtering. One or more pairs of consecutive composite layers are integrated as part of the multilayer structure of an integrated circuit, to form a capacitor integrated with the integrated circuit, with terminal electrodes comprising vias within the multilayer structure.

The foregoing features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIGS. 1A and 1B illustrate first and second consecutive composite layers in a first prior art multilayer capacitor structure having a single lead portion on each layer;

FIGS. 2A and 2B illustrate first and second consecutive composite layers in a second prior art multilayer capacitor structure having a single lead portion on each layer;

FIGS. 3A and 3B illustrate first and second consecutive composite layers in a third prior art multilayer capacitor structure having multiple lead portions on opposing edges of each layer;

FIGS. 4A and 4B illustrate first and second consecutive composite layers in a fourth prior art multilayer capacitor structure having multiple lead portions on a single edge of each layer;

FIGS. 5A and 5B illustrate first and second consecutive composite layers incorporating slots in a multilayer capacitor structure of the present invention;

FIG. 6 is an exploded view of an assembled multilayer capacitor structure of FIGS. 5A and 5B;

FIG. 7 is a perspective view of the assembled multilayer capacitor structure of FIG. 6;

FIG. 8 is a sectional view of the assembled multilayer capacitor structure of FIG. 6;

FIGS. 9A and 9B illustrate first and second consecutive composite layers in an embodiment of a multilayer capacitor structure of the present invention, incorporating opposing terminations of opposite polarity;

FIGS. 14A and 14B show first and second consecutive composite layers in an embodiment of a multilayer capacitor structure of the present invention similar to FIGS. 12A and 12B, but having four transverse slots and opposing terminations of opposite polarity;

FIG. 15A is a sectional view of a multilayer capacitor structure of the present invention illustrating a vertically aligned arrangement of transverse slots within each layer;

FIG. 15B is a sectional view of an embodiment of the multilayer capacitor structure of the present invention illustrating a staggered alignment of transverse slots in adjacent pairs of layers;

Corresponding reference numerals indicate corresponding parts throughout the several figures of the drawings. It is to be understood that the drawings are for illustrating the concepts of the invention and are not to scale.

DESCRIPTION OF THE PREFERRED EMBODIMENT

Figure 10A:
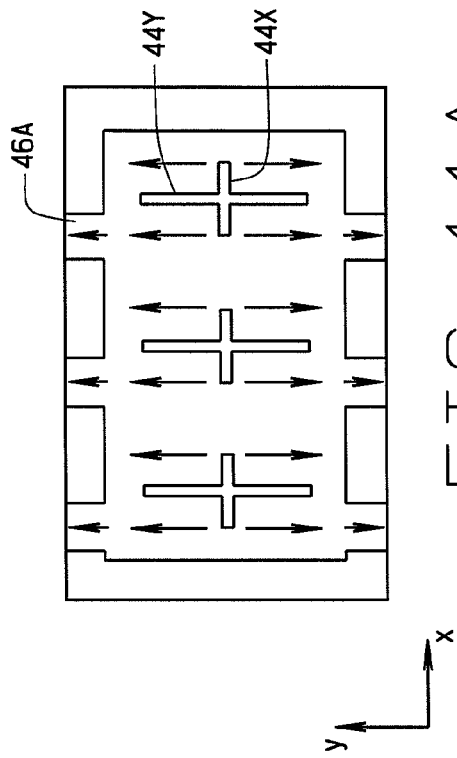
FIGS. 10A and 10B show first and second consecutive composite layers in an embodiment of a multilayer capacitor structure of the present invention, incorporating two cruciform slots per layer and having opposing terminations of the same polarity.

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

A first embodiment of a multilayer capacitor according to the principles of the invention is illustrated in FIGS. 5A and 5B and FIG. 6. FIGS. 5A and 5B show a pair of consecutively stacked composite layers of an extremely low inductance multilayer capacitor comprising a first generally rectangular composite layer 40A and a second generally rectangular composite layer 40B arranged congruently. It will be recognized that the layers may be formed in configurations other than rectangular, and may include disc or polygonal configurations. Composite layers 40A and 40B comprise dielectric substrates 41A and 41B, and conductor plates 42A and 42B respectively. Plates 42A and 42B include main portions 43A and 43B respectively, each with longitudinal dimension Dx along the x-axis, and transverse dimension Dy along the y-axis, with reference to the coordinate system shown. Each of the main portions 43A and 43B of the plates advantageously includes one or more generally rectangular slots 44Y, oriented in the transverse, or y, direction, and one or more generally rectangular slots 44X, oriented in the longitudinal, or x, direction Each of the slots 44Y and 44X comprises an opening, or a plurality of openings, in the main portion of the conductor plate.

Each opening is characterized by an absence of conductive material or metallization, thus enabling the slots 44Y and 44X to serve as barriers to the flow of current. The slots 44Y each have a length Sy along the y-axis and a width Wx along the x-axis. The length Sy of a slot 44Y is typically less than or equal to 70% of the transverse dimension of the main portion of the conductor plate, i.e., $Sy \leq 0.7\, Dy$, and the slot is preferably centered with respect to, and within, the transverse dimension Dy. The width Wx of a slot 44Y is typically less than or equal to 5% of the longitudinal dimension of the main portion of the conductor plate, i.e., $Wx \leq 0.05\, Dx$. The slots 44X each have a length Sx along the x-axis and a width Wy along the y-axis.

The slots 44X are positioned on, or close to, the centerline in the longitudinal, or x, direction of the main portion of the conductor plate. The slots 44X can overlap, or cross over, the slots 44Y to form cruciform slot structures, or they can be spatially separate. The length Sx of the slots 44X are chosen such that the sum of the lengths, $\Sigma x$, of all the slots 44X is at least 50% of the longitudinal dimension of the main portion of the conductor plate, i.e., $\Sigma x \geq 0.5\, Dx$. A particular case is embodiments wherein a single slot 44X traverses the entirety of the longitudinal dimension of the main portion of the conductor plate, i.e., $\Sigma x = Sx = Dx$, dividing the main portion of the plate into lateral halves. The width Wy of a slot 44X is typically less than or equal to 10% of the transverse dimension of the main portion of the conductor plate, i.e., $Wy \leq 0.1\, Dy$. The area occupied by the slots 44Y and 44X is a small fraction of the area DxDy of the main portion of the conductor plates, thus allowing this multilayer capacitor to retain, within tolerances, a similar level of capacitance as that of a conventional multilayer capacitor of the same size.

In the following, for brevity, the slots 44Y in the transverse direction will also be referred to as transverse slots, and the slots 44X in the longitudinal direction will also be referred to as longitudinal slots.

Plate 42A additionally includes one or more lead portions 45A disposed along one of the longitudinal edges of the plate, and one or more lead portions 46A disposed along the opposed longitudinal edge. Plate 42B additionally includes one or more lead portions 45B and 46B disposed along each of the corresponding longitudinal edges of the plate. Preferably, the number of lead portions 45A, 45B, 46A and 46B are equal. The lead portions 45A and 45B are positioned such that they are along the same longitudinal edge of the structure, and are offset from each other in an alternating pattern when the composite layers are stacked vertically. The lead portions 46A and 46B are positioned in a similar fashion.

This positioning is shown in FIG. 6, which is an exploded perspective view of the vertical stacking employed to create the structure of the multilayer capacitor. With reference to the coordinate system shown in FIG. 6, the first and second consecutive composite layers 40A and 40B comprising a pair are stacked along the z-axis. While only one pair of consecutive composite layers is shown in the figure for illustration, the number of pairs of composite layers in the stack of the multilayer capacitor of the present invention ranges from one to several hundred. The stack can additionally include one or more dielectric substrates 50 and 51 located at the top and bottom of the stack respectively, for insulation and mechanical integrity. This is preferable when the multilayer capacitor is fabricated using multilayer ceramic techniques.

Each of the lead portions 45A and 45B, and 46A and 46B, in the pair of consecutive composite layers, extends to the corresponding longitudinal edge of the substrates 41A and 41B to enable connection to external terminal electrodes, or terminations. Lead portions 45A and 46A of plate 42A are connected to terminations of one polarity, and lead portions 45B and 46B of plate 42B are connected to terminations of an opposite polarity. The number of terminations equals the number of lead portions in a pair of consecutive composite layers, and the longitudinal positions of the terminations are determined by the longitudinal positions of the lead portions in the pair.

As shown, the multilayer capacitor of FIGS. 5A and 5B and FIG. 6 constitutes an 8 terminal device, with 4 terminations along each longitudinal edge, alternating in polarity. The conductor plates 42A and 42B in consecutive composite layers each includes three transverse slots 44Y and three longitudinal slots 44X. When a positive potential is applied to plate 42A, and a corresponding negative potential is applied to plate 42B, the charging process leads to electron currents through the plates in the directions shown by the arrows 47A and 47B, respectively. Since each plate has terminations on opposing longitudinal edges, and since each plate includes longitudinal slots 44X that inhibit the flow of current across the longitudinal centerline of the plate, half the current in each plate traverses a length that is half of Dy, independent of the symmetry, or lack thereof, of the external circuitry connected to these opposing terminations. This leads to a decrease, in all cases, in both the self inductance, Ls, and the mutual inductance, M, between the plates.

In each plate, the current flow in regions of the plate on either side of, and directly (longitudinally) across each transverse slot 44Y is substantially in the same direction. The transverse slots 44Y, by providing barriers to current flow along the x-axis, ensure that the current flow through each plate is predominantly along the y-axis. This, coupled with the fact that the plates are at opposite potentials, leads to currents through the main portion of plate 42A that are matched by equal and opposite currents through the main portion of plate 42B. The mutual inductance is thus subtractive in nature, and the inductance of the structure is:

$$L \sim Ls - M.$$

As shown by the arrows 47A and 47B, the presence of the slots 44X and 44Y governs the magnitude of the currents through each half of the conductor plates, and provides a directionality to the current flow through plates in consecutive layers that leads to currents that are opposed to each other to a high degree, in magnitude and direction, over the expanse of the main portions of the plates. The magnitude of the mutual inductance M thus approaches that of the self inductance Ls, resulting in an extremely low value for the inductance, L, of the structure. When fabricated using multilayer ceramic techniques, the inductance of this multilayer capacitor can be reduced to the level of 10 pH or less, in capacitors using a relatively small number of terminations, typically 8, 12 or 16.

FIG. 7 shows a perspective view of a preferred embodiment of the multilayer capacitor of FIGS. 5A and 5B and FIG. 6 as a discrete surface mount device 60, fabricated using a multilayer ceramic technique. The stack up shown in FIG. 6, including multiple pairs of consecutive composite layers 40A and 40B, and multiple top and bottom dielectric layers 50 and 51, is made in an array form using ceramic green sheets with thick-film metallization for the composite layers, and ceramic green sheets for the top and bottom dielectric layers. The stack up is laminated, diced, and sintered to form individual capacitor structures, each in the form of a generally rectangular parallelepiped 61 that is a monolithic ceramic body. Terminal electrodes, or terminations, 62A to 65A and 62B to 65B, are then applied to the ceramic body 61 using thick-film conductive paste and plating to yield device 60. The terminations are applied such that each lead portion 45A, 45B, 46A and 46B of FIGS. 5A and 5B and FIG. 6 is connected to a respective termination of device 60. The lead portions 45A and 45B are connected to respective terminations 62A to 65A, and the lead portions 46A and 46B are connected to respective terminations 62B to 65B. The set of terminations 62A to 65A and the set 62B to 65B are disposed along opposite longitudinal edge surfaces, 66 and 67 respectively, each edge surface being parallel to the x-z plane, with reference to the coordinate system shown.

FIG. 8 shows a transverse section, in the y-z plane, of the multilayer capacitor device 60 of FIG. 7 mounted onto a circuit device 600. Circuit device 600 comprises an electronic package, a circuit board, or a circuit card, that includes a multilayer substrate 601. Substrate 601 includes mounting pads 602, appropriately sized and positioned to receive the terminations 62A to 65A and 62B to 65B of device 60. The mounting pads 602 are coated with solder paste, a pick-and-place technique is used to place device 60 onto device 600, and the devices are then interconnected in a solder reflow process. The section shown in FIG. 8 is taken across the terminations 62A and 62B of device 60, so as to show a cross section of the ceramic body 61, the terminations 62A and 62B, and the conductor plates 42A and 42B, including slots 44X, of device 60, the substrate 601 and mounting pads 602, of device 600, and interconnecting solder 603.

In the following, terminations such as 62A and 62B, or 64A and 64B, which are positioned directly opposite each other along the transverse direction or y-axis, will be referred to as opposing terminations. In the embodiment shown in FIGS. 5A and 5B, and FIGS. 6 and 7, opposing terminations have the same polarity, and the transverse slots 44Y in each plate are located between terminations along either longitudinal edge.

FIGS. 9A and 9B show an alternative embodiment of an extremely low inductance multilayer capacitor that is similar to the multilayer capacitor of FIGS. 5A and 5B and FIG. 6, except that the lead portions 46A and 46B are positioned such that opposing terminations have opposite polarity.

The number, Ns, of transverse slots 44Y in each plate depends on the algorithm used to select locations for the slots, and the number, Nt, of terminations in the multilayer capacitor. Advantageously, one of the following three algorithms, A1, A2 and A3, can be used to select locations for the slots 44Y, and determine the number of transverse slots Ns for a given number of terminations Nt:

A1.) Slots 44Y are located between consecutive terminations along either longitudinal edge. The number of transverse slots in this case is Ns=Nt/2−1. The minimum number of terminations is four.

A2.) Slots 44Y are located between the first two terminations and the last two terminations along either longitudinal edge, and between consecutive pairs of terminations otherwise. The number of transverse slots in this case is Ns=Nt/4. The minimum number of terminations is four.

A3.) Slots 44Y are located between consecutive pairs of terminations along either longitudinal edge. The number of transverse slots in this case is Ns=Nt/4−1. The minimum number of terminations is eight.

The longitudinal slots 44X are located on, or close to, the centerline in the longitudinal, or x, direction of each of the main portions 43A and 43B of the conductor plates. They can overlap, or cross over, the transverse slots 44Y to form cross-shaped, or cruciform, slot structures, or they can be spatially separate. In embodiments where a slot 44X crosses over a slot 44Y to form a cross-shaped structure, the slot 44X can be centered, with respect to its length Sx, across the slot 44Y, or it can be offset. For any particular embodiment, each plate advantageously has the same number of slots 44Y, and the same number of slots 44X.

FIGS. 5A and 5B and FIGS. 9A and 9B show embodiments that use the first algorithm, A1, to select locations for slots 44Y. The number of terminations is 8, and the number of slots 44Y is 3. The number of longitudinal slots 44X is 3, and each slot 44X crosses over, and is centered across, a slot 44Y, to form a symmetric cross-shaped structure.

Figure 10B:
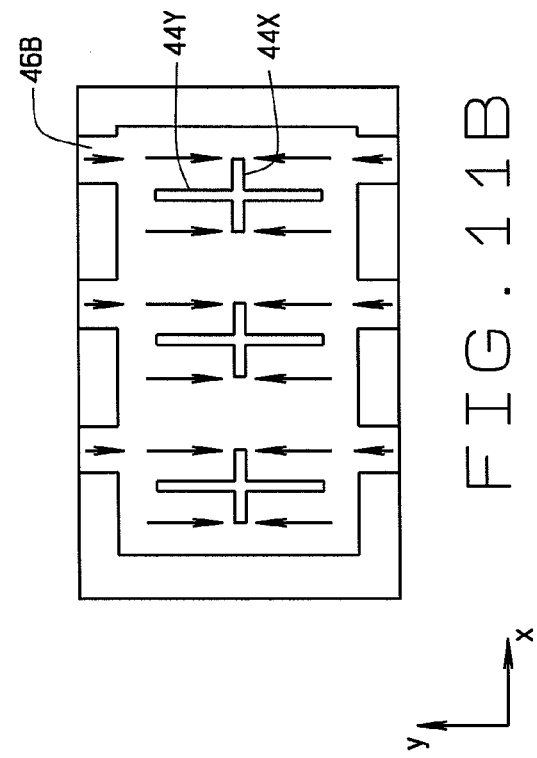

FIGS. 10A and 10B show an embodiment of the present invention that uses the second algorithm, A2, to select locations for slots 44Y. The number of terminations is 8, and the number of slots 44Y is 2. The number of longitudinal slots 44X is 2, and each slot 44X crosses over, and is offset across, a slot 44Y, to form an asymmetric cross-shaped structure. In this embodiment, the lead portions 46A and 46B are positioned such that opposing terminations have the same polarity.

Figure 11A:
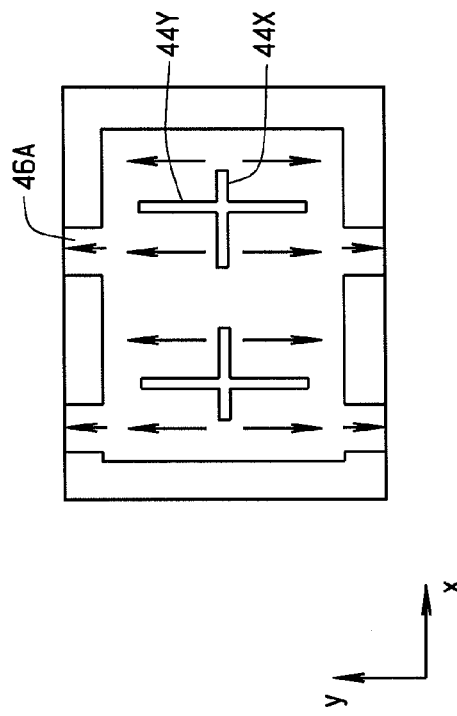
FIGS. 11A and 11B illustrate first and second consecutive composite layers in an embodiment of a multilayer capacitor structure of the present invention incorporating three cruciform slots per layer, and having opposing terminations of the same polarity.
Figure 11B:
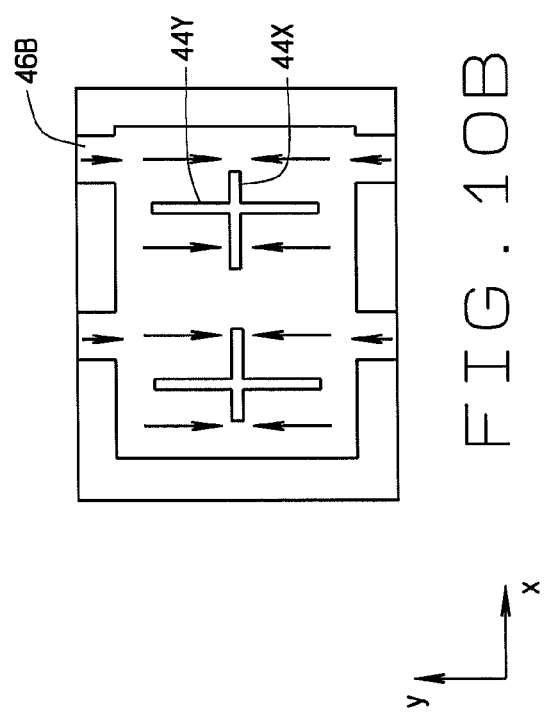

FIGS. 11A and 11B show an embodiment of the present invention in which the second algorithm, A2, is used to select locations for slots 44Y. The number of terminations is 12, and the number of slots 44Y is 3. The number of longitudinal slots 44X is 3, and each slot 44X crosses over, and is centered across, a slot 44Y, to form a symmetric cross-shaped structure. In this embodiment, the lead portions 46A and 46B are positioned such that opposing terminations have the same polarity.

Figure 12A:
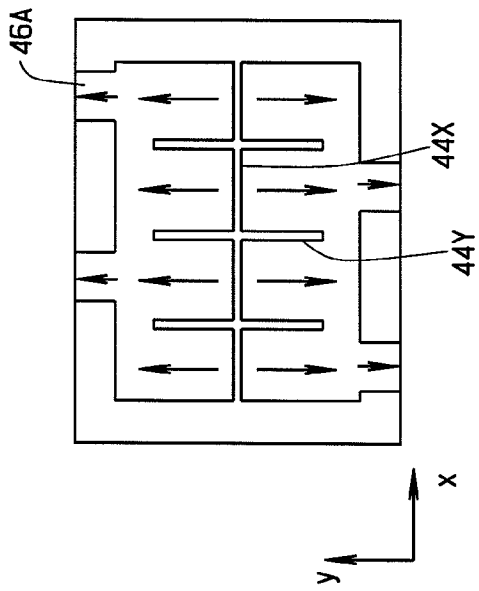
FIGS. 12A and 12B show first and second consecutive composite layers in an embodiment of a multilayer capacitor structure of the present invention incorporating a single longitudinal slot per layer, intersecting a plurality of transverse slots, and having opposing terminations of the same polarity.
Figure 12B:
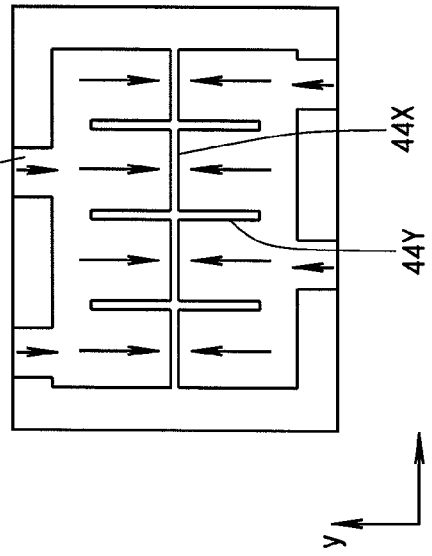

FIGS. 12A and 12B show an alternative embodiment of the present invention in which a single longitudinal slot 44X traverses the entirety of the longitudinal dimension of each of the main portions of the conductor plates 42A and 42B in a pair of consecutive composite layers. The first algorithm, A1, is used to select locations for transverse slots 44Y. The number of terminations is 8, the number of slots 44Y is 3, and the lead portions 46A and 46B are positioned such that opposing terminations have the same polarity.

As shown in FIGS. 12A and 12B, the slot 44X physically divides each of the conductor plates 42A and 42B into lateral halves 100A and 101A, and 100B and 101B, respectively. Lateral halves 100A and 100B include lead portions 45A and 45B, respectively, and lateral halves 101A and 101B include lead portions 46A and 46B, respectively. In this case, in embodiments where the slot 44X comprises a single opening in the conductor plate, the multilayer capacitor can function as a single capacitor, or as two individual capacitors, one comprising 4 terminations alternating in polarity connected to lead portions 45A and 45B, and the other comprising 4 terminations alternating in polarity connected to lead portions 46A and 46B. As shown by the arrows 47A and 47B, the currents in lateral halves 100A and 100B are opposed to each other to a high degree, as are the currents in lateral halves 101A and 101B, enabling each of the two individual capacitors to function as an extremely low inductance capacitor. Thus, in these embodiments, the multilayer capacitor can be used as a single capacitor, or as a dual capacitor in a single structure, or package. The latter is particularly advantageous for use with IC's that require two different supply voltages, such as dual-voltage or dual-core processors.

Figure 13A:
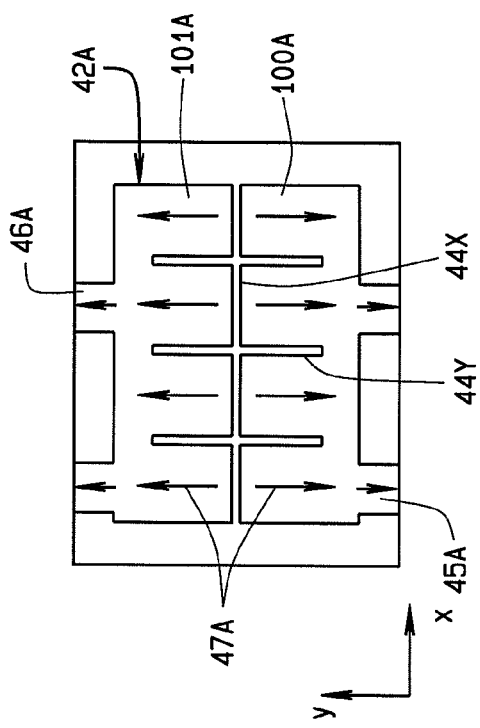
FIGS. 13A and 13B show first and second consecutive composite layers in an embodiment of a multilayer capacitor structure of the present invention similar to FIGS. 12A and 12B, but having opposing terminations of opposite polarity.
Figure 13B:
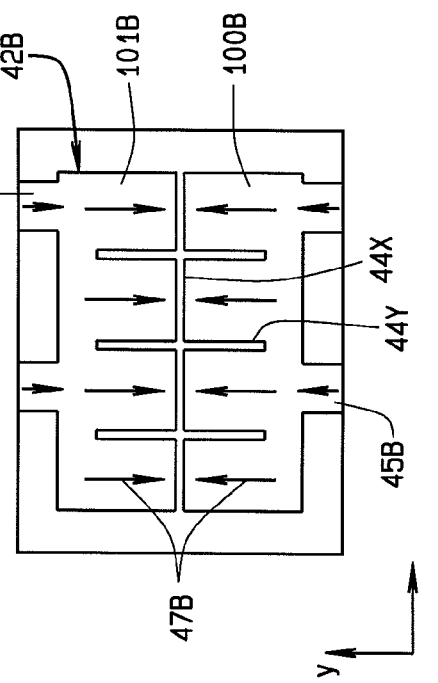

FIGS. 13A and 13B show an embodiment of an extremely low inductance multilayer capacitor that is similar in all respects to the multilayer capacitor of FIGS. 12A and 12B, except that the lead portions 46A and 46B are positioned such that opposing terminations have opposite polarity.

FIGS. 14A and 14B show another embodiment of the present invention in which a single longitudinal slot 44X traverses the entirety of the longitudinal dimension of each of the main portions of the conductor plates. The second algorithm, A2, is used to select locations for transverse slots 44Y. The number of terminations is 16, and the number of slots is 4. In this embodiment, the lead portions 46A and 46B are positioned such that opposing terminations have opposite polarity.

The transverse slots 44Y in the main portions of conductor plates in successive composite layers are preferably vertically aligned with respect to each other in the transverse direction, or y-axis. They can also be vertically aligned with respect to each other in the longitudinal direction, or they can be alternately staggered with respect to each other, preferably in consecutive pairs of layers, or otherwise, in the longitudinal direction, or x-axis. This is illustrated in FIGS. 15A and 15B, which show longitudinal sections 130A and 130B, in the x-z plane with respect to the coordinate system shown, of embodiments in which the slots 44Y are vertically aligned and staggered, respectively.

FIG. 15A shows an embodiment in which the slots 44Y in main plate portions, 43A and 43B, in successive composite layers are all vertically aligned with respect to each other. FIG. 15B shows an embodiment in which the slots 44Y in main plate portions 43A and 43B in a pair of consecutive layers are vertically aligned with respect to each other, but are staggered by a length Gx in the longitudinal, or x, direction with respect to the next consecutive pair of layers. This staggering is advantageously in an alternate, or zig-zag, fashion along the vertical axis, as shown in FIG. 15B.

Staggering of the slots is particularly advantageous in the case of extremely low inductance multilayer capacitors fabricated using multilayer ceramic to promote conformal lamination and, therefore, mechanical integrity of the structure. Typically, a stagger length Gx between Wx and 5 Wx is sufficient, where Wx is the width of the slots 44Y. Preferably, the staggering is in pairs of consecutive layers, as shown. As an alternative to staggering, the slots can be filled with non-conductive material, such as dielectric paste in the case of multilayer ceramic fabrication.

The longitudinal slots 44X in the main portions of conductor plates in successive composite layers are preferably vertically aligned with respect to each other in the longitudinal direction, or x-axis. They can also be vertically aligned with respect to each other in the transverse direction, or they can be alternately staggered with respect to each other, preferably in consecutive pairs of layers, or otherwise, in the transverse direction, or y-axis. This is illustrated in FIGS. 16A and 16B, which show transverse sections 140A and 140B, in the y-z plane with respect to the coordinate system shown, of embodiments in which the slots 44X are vertically aligned and staggered, respectively.

Figure 16A:
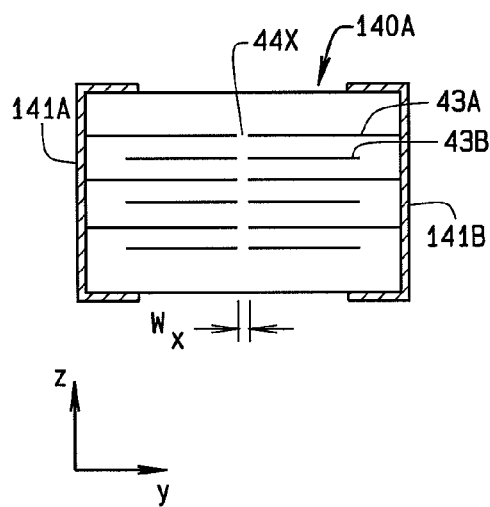
FIG. 16A is a sectional view of a multilayer capacitor structure of the present invention illustrating a vertically aligned arrangement of longitudinal slots within each layer.

FIG. 16A shows an embodiment in which the slots 44X in main plate portions, 43A and 43B, in successive composite layers are all vertically aligned with respect to each other. FIG. 16B shows an embodiment in which the slots 44X in main plate portions 43A and 43B in a pair of consecutive layers are vertically aligned with respect to each other, but are staggered by a length Gy in the transverse, or y, direction with respect to the next consecutive pair of layers. This staggering is advantageously in an alternate, or zig-zag, fashion along the vertical axis, as shown in FIG. 16B.

Staggering of the slots is particularly advantageous in the case of extremely low inductance multilayer capacitors fabricated using multilayer ceramic to promote conformal lamination and, therefore, mechanical integrity of the structure. Typically, a stagger length Gy between Wy and 5 Wy is sufficient, where Wy is the width of the slots 44X. Preferably, the staggering is in pairs of consecutive layers, as shown. As an alternative to staggering, the slots can be filled with non-conductive material, such as dielectric paste in the case of multilayer ceramic fabrication.

Figure 16B:
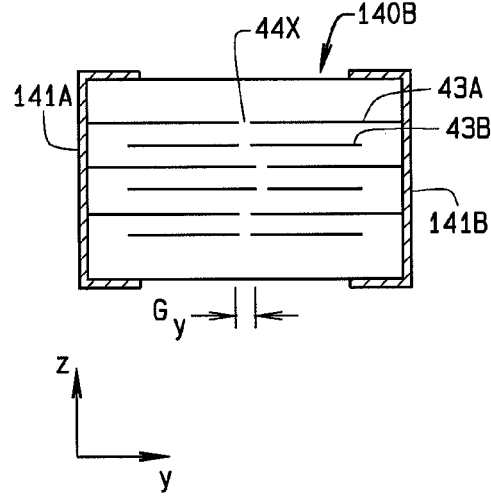
FIG. 16B is a sectional view of an embodiment of the multilayer capacitor structure of the present invention illustrating a staggered alignment of the longitudinal slots in adjacent pairs of layers.

The transverse sections 140A and 140B illustrated in FIGS. 16A and 16B are those of an embodiment of the present invention as a discrete surface mount device, fabricated using multilayer ceramic techniques, similar to the device 60 of FIG. 7. The sections are taken across a pair of opposing terminations, 62A and 62B, as shown by the termination cross sections 141A and 141B, respectively, in FIGS. 16A and 16B.

The slots 44Y and 44X comprise openings, or a plurality of openings, in the main portions of the conductor plates, so as to function as barriers to the flow of current by introducing additional resistance in the current path. The resistance, Rs, across a region of a conductor plate comprising a slot is generally much greater than the resistance, Rp, across an equivalent region of the conductor plate that does not comprise a slot. Advantageously, $Rs \geq 5\ Rp$ serves as a criterion to achieve the required functionality of a slot. This functionality of the slots can be attained using any of the following embodiments, S1, S2 and S3, for a slot:

S1.) The slot comprises a complete opening in the main portion of the plate, over the length of the slot.

S2.) The slot comprises a plurality of irregular openings, of different sizes and shapes, in the main portion of the conductor plate, generally distributed non-uniformly over the length and width of the slot. This is the most general embodiment of a slot.

S3.) The slot comprises a plurality of regular openings in the main portion of the conductor plate, over the length of the slot.

Figure 17:
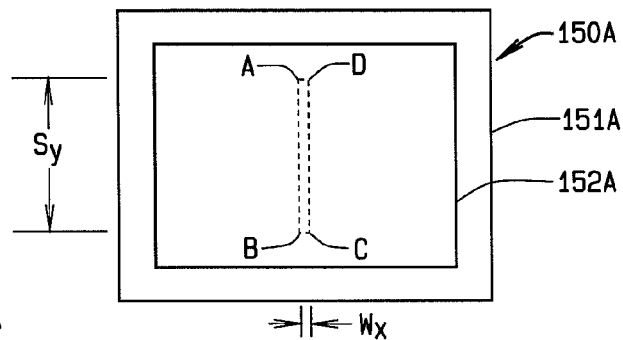
FIG. 17 illustrates a main conductor plate portion without a slot present in region ABCD.
Figure 18:
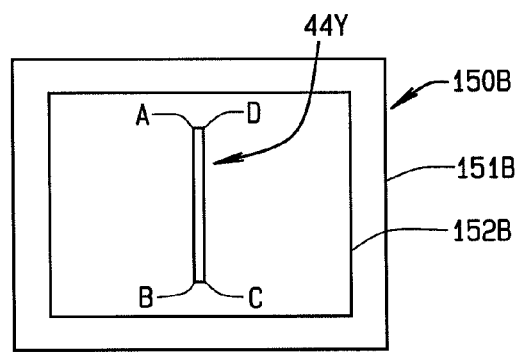
FIG. 18 illustrates a main conductor plate portion with a full slot present in region ABCD.
Figure 19:
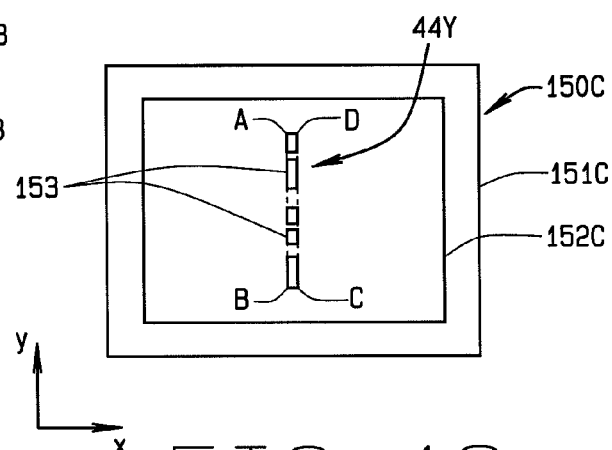
FIG. 19 illustrates a main conductor plate portion having a plurality of irregular openings present in region ABCD.

FIGS. 17, 18 and 19 illustrate the functional definition of a slot, using a transverse slot 44Y as an example. Illustrative composite layers 150A, 150B and 150C comprise dielectric substrates 151A, 151B and 151C, respectively, and main portions 152A, 152B and 152C, respectively, of conductor plates. A generally rectangular region ABCD, with dimensions Sy and Wx identical to a transverse slot, is outlined in each main conductor plate portion. The main conductor plate portion 152A in FIG. 17 does not include a slot. The resistance Rp across the region ABCD in the longitudinal direction, from the line AB to the line DC, is thus the typically low resistance associated with the metallization of the conductor plate. The region ABCD in FIG. 18 comprises a slot 44Y of the slot embodiment S1. Since this slot comprises a complete opening, characterized by an absence of conductor material or metallization, the resistance Rs across the region ABCD is far greater than Rp, typically by orders of magnitude. The criterion $Rs \geq 5\ Rp$ is clearly met in this case.

The region ABCD in FIG. 19 comprises a slot 44Y of the slot embodiment S2. This slot comprises a plurality of irregular openings 153 generally distributed non-uniformly over the length and width of the slot. Each opening 153 is characterized by the absence of conductor material or metallization, and the openings can be of different sizes and shapes. The number and size of irregular openings 153 are chosen such that the resistance Rs across the region ABCD meets the criterion $Rs \geq 5\ Rp$. In any particular embodiment of a multilayer capacitor of the present invention, each of the slots 44Y and 44X can comprise a slot of any of the slot embodiments S1, S2 or S3.

Figure 20A:
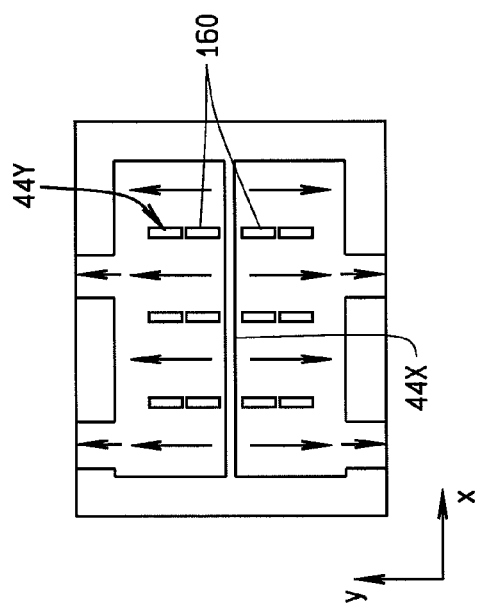
FIGS. 20A and 20B show first and second consecutive composite layers in an embodiment of a multilayer capacitor structure of the present invention incorporating a single longitudinal slot and a plurality of transverse slots per layer, each transverse slot comprising four regular openings.
Figure 20B:
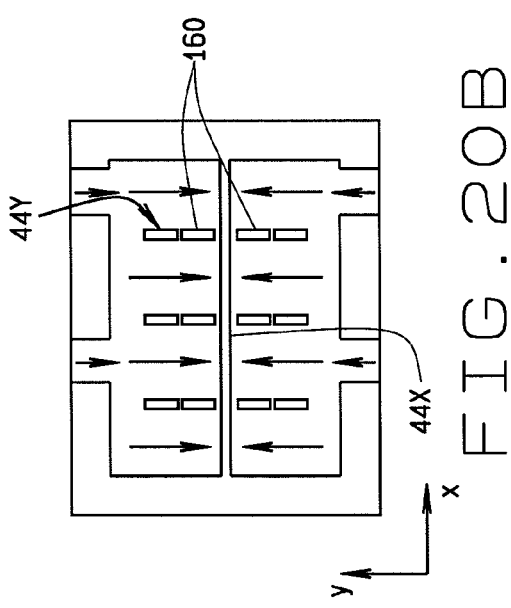

FIGS. 20A and 20B show an embodiment of the present invention that includes a longitudinal slot 44X of the slot embodiment S1, and transverse slots 44Y of the slot embodiment S3. Each slot 44Y comprises 4 regular openings 160 over the length of the slot. The size of the openings 160 is selected such that the criterion $Rs \geq 5\ Rp$ is met.

Figure 21A:
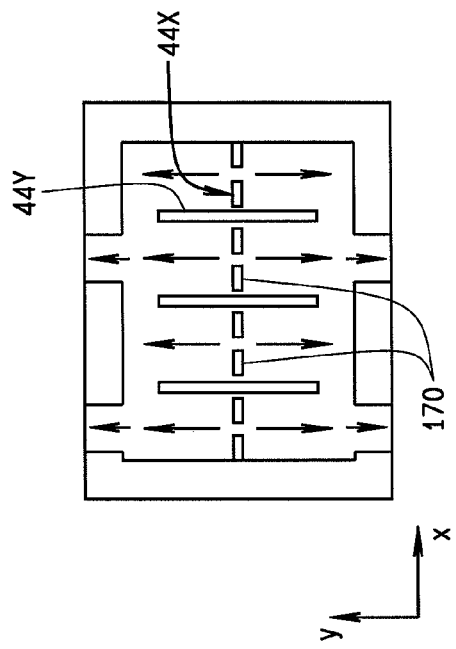
FIGS. 21A and 21B show first and second consecutive composite layers in an embodiment of a multilayer capacitor structure of the present invention incorporating in each layer a single longitudinal slot comprising a set of regular openings and a plurality of transverse slots.
Figure 21B:
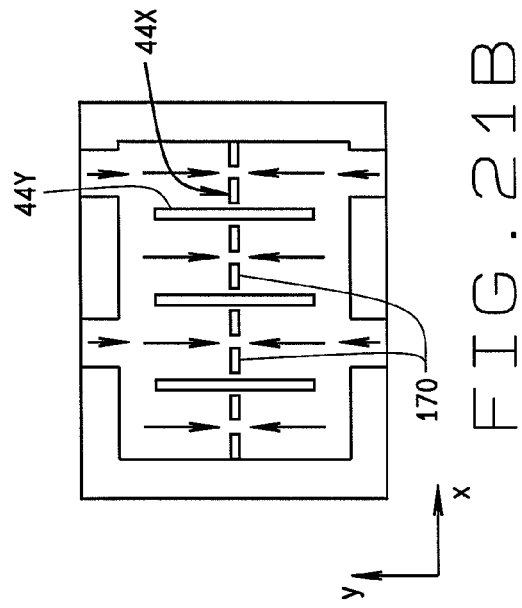

FIGS. 21A and 21B show an embodiment of the present invention that includes a longitudinal slot 44X of the slot embodiment S3, and transverse slots 44Y of the slot embodiment S1. The slot 44X comprises a plurality of regular openings 170 over the length of the slot. The size and number of the openings 170 is selected such that the criterion $Rs \geq 5\ Rp$ is met.

Figure 22A:
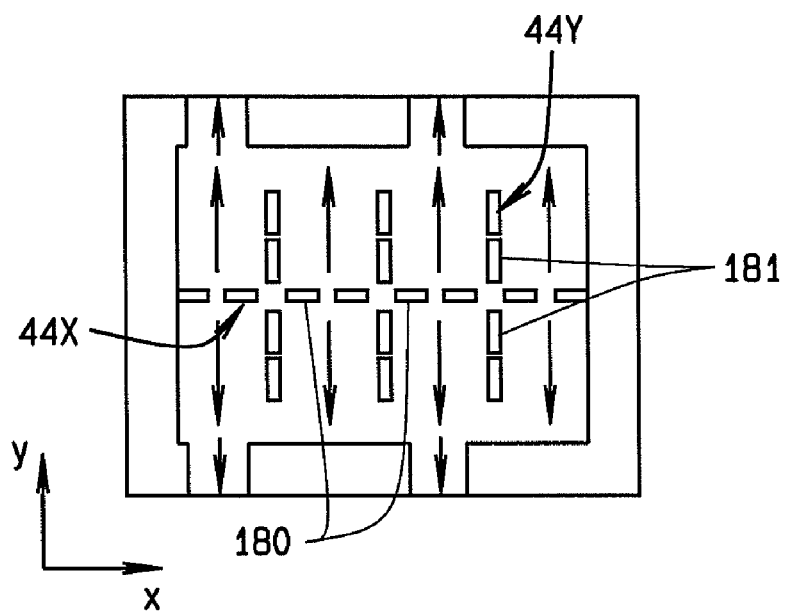
FIGS. 22A and 22B show first and second consecutive composite layers in an embodiment of a multilayer capacitor structure of the present invention incorporating in each layer a single longitudinal slot and a plurality of transverse slots, each slot comprising a set of regular openings.
Figure 22B:
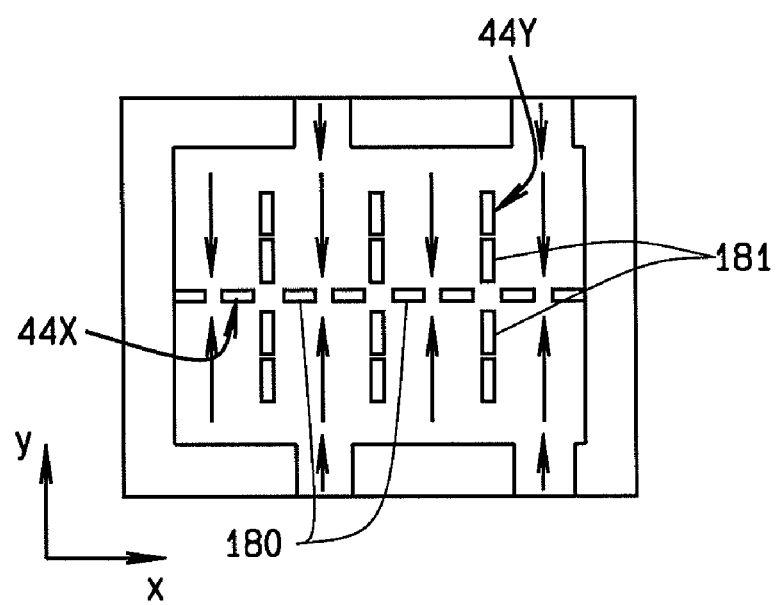

FIGS. 22A and 22B show an embodiment of an extremely low inductance multilayer capacitor that includes a longitudinal slot 44X of the slot embodiment S3, and transverse slots 44Y also of the slot embodiment S3. The slot 44X comprises a plurality of regular openings 180 over the length of the slot. Each slot 44Y comprises 4 regular openings 181 over the length of the slot. The size and number of openings 180, and the size of the openings 181, are selected such that the criterion $Rs \geq 5\ Rp$ is met in each case.

The slots 44Y and 44X can be formed in a multilayer ceramic by providing closures in the screen or stencil used to print the conductor plates, in a multilayer laminate process by appropriate patterning of the photoresist used in the etching/plating process, and in a thin-film multilayer deposition process by providing closures in the mask used to deposit the conductor plates, or by laser ablation.

It is to be understood that the above described embodiments are illustrative of only a few of the many possible specific embodiments which can represent applications of the principles of the invention. Numerous and varied other arrangements can be readily devised by those skilled in the art without departing from the spirit and scope of the invention.

In accordance with the principles of the invention, the foregoing describes a multilayer parallel plate capacitor with an extremely low inductance, comprising: a structure in the form of a generally rectangular parallelepiped comprising one or more pairs of generally rectangular consecutive composite layers; each pair comprising a first and a second composite layer stacked parallel to each other in a vertical direction; each first and second composite layer comprising a dielectric substrate and a conductor plate thereon, both extending in a longitudinal and a transverse direction; the conductor plate of each composite layer comprising a generally rectangular main portion; the main portion of the conductor plate of each composite layer including one or more slots in the transverse direction, and one or more slots in the longitudinal direction; the conductor plate of each composite layer further comprising one or more lead portions disposed along each of opposing longitudinal edges of the conductor plate; the lead portions positioned such that the lead portions of the conductor plate of the first composite layer and the lead portions of the conductor plate of the second composite layer are offset from each other in an alternating pattern along each longitudinal edge of the structure when the composite layers are stacked in the vertical direction; and wherein the lead portions of the conductor plate of the first composite layer are connected to terminations of one polarity, and the lead portions of the conductor plate of the second composite layer are connected to terminations of an opposite polarity.

This capacitor of the present invention can be fabricated using multilayer ceramic techniques, multilayer laminate techniques, or multilayer deposition techniques, in the form of a discrete device, or integrated within, and as part of, a circuit device.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A multilayer capacitor having at least one pair of consecutively stacked composite layers, each composite layer in said pair having a dielectric substrate and a conductor plate disposed on said dielectric substrate, each conductor plate including a main portion, at least two longitudinal edges and at least one lead portion on each longitudinal edge; and each of said conductor plates having at least one transversely aligned slot disposed within the main portion, and at least one longitudinally aligned slot disposed within the main portion, whereby in each conductor plate, a current flow in regions of the plate on either side of, and directly across each transverse slot is substantially in the same direction.

2. The multilayer capacitor of claim 1 wherein said each of said slots is a barrier to flow of current.

3. The multilayer capacitor of claim 1 wherein each conductor plate main portion has a shape with a transverse dimension and each of said transversely aligned slots has a length less than about 70% of said transverse dimension of the conductor plate main portion.

4. The multilayer capacitor of claim 1 wherein each conductor plate main portion has a shape with a longitudinal dimension and each of said transversely aligned slots has a width less than about 5% of said longitudinal dimension of the conductor plate main portion.

5. The multilayer capacitor of claim 1 wherein each conductor plate main portion has a shape with a longitudinal dimension and said longitudinally aligned slots have a combined length at least equal to 50% of said longitudinal dimension of the conductor plate main portion.

6. The multilayer capacitor of claim 1 wherein each conductor plate main portion has a shape with a transverse dimension and each of said longitudinally aligned slots has a width less than about 10% of said transverse dimension of the conductor plate main portion.

7. The multilayer capacitor of claim 1 wherein said at least one longitudinally aligned slot is disposed on a longitudinal centerline of the conductor plate main portion.

8. The multilayer capacitor of claim 1 wherein each conductor plate main portion has a shape with a longitudinal dimension and said at least one longitudinally aligned slot traverses the entirety of said longitudinal dimension of the conductor plate main portion.

9. The multilayer capacitor of claim 8 wherein said at least one longitudinally aligned slot comprises a single opening in the main portion of the conductor plate, whereby the multilayer capacitor can function as two individual capacitors.

10. The multilayer capacitor of claim 1 wherein said at least one longitudinally aligned slot intersects said at least one transversely aligned slot, forming a cruciform slot structure.

11. The multilayer capacitor of claim 1 wherein the lead portions of the first conductor plate in the pair of consecutively stacked composite layers are connected to terminations of a first polarity;

wherein the lead portions of the second conductor plate in the pair of consecutively stacked composite layers are connected to terminations of an opposite polarity; and whereby current flow through the main portion of said first conductor plate is substantially equal and opposite to current flow through the main portion of said second conductor plate.

12. The multilayer capacitor of claim 1 wherein the lead portions of the first conductor plate in the pair of consecutively stacked composite layers are longitudinally offset in an alternating pattern from the lead portions of the second conductor plate in the pair.

13. The multilayer capacitor of claim 12 wherein each conductor plate has two opposite longitudinal edges, and the lead portions on opposite edges of each conductor plate are longitudinally offset from each other; and wherein transversely opposing lead portions on said pair of consecutively stacked composite layers are connected to terminations of opposite polarity.

14. The multilayer capacitor of claim 12 wherein each conductor plate has two opposite longitudinal edges, and lead portions on said opposite edges of each conductor plate are longitudinally aligned with each other; and wherein transversely opposing lead portions on said pair of consecutively stacked composite layers are connected to terminations of the same polarity.

15. The multilayer capacitor of claim 1 wherein the total number of transverse slots in each conductor plate is equal to one less than half the total number of lead portions in the pair of conductor plates.

16. The multilayer capacitor of claim 15 wherein the pair of conductor plates are aligned along a common longitudinal edge and each of said transverse slots is disposed between consecutive lead portions along the common longitudinal edge.

17. The multilayer capacitor of claim 1 wherein the total number of transverse slots in each conductor plate is equal to one quarter of the total number of lead portions in the pair of conductor plates.

18. The multilayer capacitor of claim 17 wherein the pair of conductor plates are aligned along a common longitudinal edge and wherein a first transverse slot is located in each conductor plate between the first two consecutive lead portions in the pair of conductor plates along the common longitudinal edge;
  for pairs of conductor plates having at least three lead portions along said selected longitudinal edge, a second transverse slot is located in each conductor plate between the last two consecutive lead portions in the pair of conductor plates; and
  for pairs of conductor plates having more than three lead portions along said selected longitudinal edge, additional transverse slots are located in each conductor plate between each consecutive pair of lead portions in the pair of conductor plates, said consecutive pairs of lead portion excluding said first two lead portions and said last two lead portions.

19. The multilayer capacitor of claim 1 wherein the total number of transverse slots in each conductor plate is equal to one less than one quarter of the total number of lead portions in the pair of conductor plates.

20. The multilayer capacitor of claim 19 wherein the pair of conductor plates is aligned along a common longitudinal edge and each of said transverse slots is disposed between consecutive pairs of lead portions along the common longitudinal edge.

21. The multilayer capacitor of claim 1 wherein said transverse slots disposed in consecutive pairs of composite layers are vertically aligned.

22. The multilayer capacitor of claim 1 wherein said transverse slots disposed in consecutive pairs of composite layers are alternately staggered in the longitudinal direction.

23. The multilayer capacitor of claim 22 wherein said transverse slots have a common width and are alternately staggered in the longitudinal direction by a displacement between 1.0 and 5.0 times the common width of said transverse slots.

24. The multilayer capacitor of claim 1 wherein said longitudinal slots disposed in consecutive pairs of composite layers are vertically aligned.

25. The multilayer capacitor of claim 1 wherein said longitudinal slots disposed in consecutive pairs of composite layers are alternately staggered in a transverse direction.

26. The multilayer capacitor of claim 25 wherein said longitudinal slots have a common width and are alternately staggered in the transverse direction by a displacement between 1.0 and 5.0 times the common width of said longitudinal slots.

27. The multilayer capacitor of claim 1 wherein each of said slots is filled with a non-conductive material.

28. The multilayer capacitor of claim 1 wherein each of said transverse slots comprises a plurality of regular openings in the main portion of the conductor plate.

29. The multilayer capacitor of claim 1 wherein each of said longitudinal slots comprises a plurality of regular openings in the main portion of the conductor plate.

30. The multilayer capacitor of claim 1 wherein each of said transverse slots comprises a plurality of irregular openings in the main portion of the conductor plate.

31. The multilayer capacitor of claim 1 wherein each of said longitudinal slots comprises a plurality of irregular openings in the main portion of the conductor plate.

32. The multilayer capacitor of claim 1 wherein each of said transverse slots comprises a single opening in the main portion of the conductor plate.

33. The multilayer capacitor of claim 1 wherein each of said slots defines a region of increased electrical resistance, said increased electrical resistance equal to at least five times the electrical resistance in the absence of a slot.

34. The multilayer capacitor of claim 1 wherein said dielectric substrate comprises a ceramic composition; and wherein each of said conductor plates comprises metallization formed using a thick-film deposition technique.

35. The multilayer capacitor of claim 34 further including at least one top ceramic composition dielectric layer and at least one bottom ceramic composition dielectric layer.

36. The multilayer capacitor of claim 35 wherein the layers are stacked, laminated, diced, and sintered to form a capacitor structure having a monolithic ceramic body.

37. The multilayer capacitor of claim 1 wherein said dielectric substrate comprises a composition selected from a set of compositions including a polymer composition, an organic composition, and a polymer-ceramic composition; and wherein each of said conductor plates comprises metallization formed using a plating and etching technique or a thin-film deposition technique.

38. The multilayer capacitor of claim 37 wherein the layers are stacked, laminated, and diced to form a laminated capacitor structure.

39. The multilayer capacitor of claim 1 wherein said dielectric substrate comprises a metal oxide or a nitride composition; and wherein each of said conductor plates comprises metallization formed using a thin-film deposition technique.

40. The multilayer capacitor of claim 39 wherein said dielectric substrate is fabricated using a thin-film deposition technique to form a thin-film capacitor structure.

41. The multilayer capacitor of claim 1 wherein said transverse and longitudinal slots in the main portion of each conductor plate are aligned within the pair of composite layers.

42. The multilayer capacitor of claim 1 configured as a discrete surface mount package.

43. The multilayer capacitor of claim 42 wherein said surface mount package comprises a Land Grid Array package.

44. The multilayer capacitor of claim 42 wherein said surface mount package comprises a Ball Grid Array package.

45. The multilayer capacitor of claim 1 wherein each of said longitudinal slots comprises a single opening in the main portion of the conductor plate.

46. A circuit device comprising:
  a multilayer substrate; and
  a multilayer capacitor in accordance with claim 1.

47. The circuit device of claim 46 wherein the multilayer capacitor is integrated as part of the multilayer substrate.

48. The circuit device of claim 46 wherein the multilayer capacitor is embedded in the form of a discrete device within an enclosure in the multilayer substrate.

49. The circuit device of claim 46 wherein the multilayer capacitor is a discrete device mounted on an outer surface of the multilayer substrate.

50. The circuit device of claim 46 wherein the multilayer substrate comprises a multilayer ceramic substrate.

51. The circuit device of claim 46 wherein the multilayer substrate comprises a multilayer laminate substrate.

52. The circuit device of claim 46 wherein the circuit device comprises a power supply and the multilayer capacitor is connected to provide energy storage for the power supply.

53. The circuit device of claim 46 wherein the circuit device comprises an integrated circuit and the multilayer capacitor is connected to provide decoupling, filtering, or energy storage for the integrated circuit.

54. The circuit device of claim 53 wherein the integrated circuit comprises a microprocessor.

55. The circuit device of claim 53 wherein the integrated circuit comprises a digital signal processor.

56. A multilayer parallel plate capacitor, comprising:
a structure in the form of a rectangular parallelepiped comprising at least one pair of consecutive composite layers;
each pair comprising a first and a second composite layer stacked parallel to each other in a vertical direction;
each first and second composite layer comprising a dielectric substrate and a conductor plate thereon, both extending in a longitudinal and a transverse direction;
said conductor plate of each composite layer comprising a rectangular main portion;
said main portion of said conductor plate of each composite layer including at least one slot aligned in the transverse direction, and at least one slot aligned in the longitudinal direction;
said conductor plate of each composite layer further including at least one lead portion disposed along each opposing longitudinal edge of said conductor plate;
said lead portions positioned such that lead portions of said conductor plate of said first composite layer and lead portions of said conductor plate of said second composite layer are offset from each other in an alternating pattern along each longitudinal edge of the structure when said composite layers are stacked in a vertical direction; and
wherein said lead portions of said conductor plate of said first composite layer are connected to terminations of one polarity, and said lead portions of said conductor plate of said second composite layer are connected to terminations of an opposite polarity.

57. A multilayer capacitor having at least one pair of consecutively stacked composite layers, each composite layer in said pair having a dielectric substrate and a conductor plate disposed on said dielectric substrate, the conductor plates each include a main portion and at least one lead portion on an edge; and
wherein each of said conductor plates includes a pair of orthogonally aligned slots disposed within the main portion, each of said pairs of slots aligned within the pair of composite layers.

58. The multilayer capacitor of claim 57 wherein each of said composite layers is in the form of a disc.

59. The multilayer capacitor of claim 57 wherein each of said composite layers is in the form of a polygon.

60. The multilayer capacitor of claim 57 wherein each of said composite layers is congruent.

61. The multilayer capacitor of claim 57 wherein each of said composite layers is rectangular.

* * * * *